United States Patent
Rizzo, Jr. et al.

(10) Patent No.: US 11,852,184 B2
(45) Date of Patent: Dec. 26, 2023

(54) FASTENER ELEMENT BONDED TO ANOTHER FASTENER ELEMENT

(71) Applicant: Raytheon Technologies Corporation, Farmington, CT (US)

(72) Inventors: John P. Rizzo, Jr., Vernon, CT (US); Istiak Ahmed, Queens Village, NY (US)

(73) Assignee: RTX Corporation, Farmington, CT (US)

( * ) Notice: Subject to any disclaimer, the term of this patent is extended or adjusted under 35 U.S.C. 154(b) by 560 days.

(21) Appl. No.: 16/999,322

(22) Filed: Aug. 21, 2020

(65) Prior Publication Data

US 2022/0056943 A1 Feb. 24, 2022

(51) Int. Cl.
*F16B 41/00* (2006.01)
*F16B 43/00* (2006.01)
*F02C 7/36* (2006.01)

(52) U.S. Cl.
CPC ............ *F16B 41/002* (2013.01); *F16B 43/00* (2013.01); *F02C 7/36* (2013.01)

(58) Field of Classification Search
CPC ...... F16B 41/002; F16B 43/00; F16B 43/002; F16B 11/00; F16B 11/006; F02C 7/36; B29C 66/43; B32B 37/0076; B32B 37/1292
USPC .................. 411/532, 533, 534, 999; 156/291
See application file for complete search history.

(56) References Cited

U.S. PATENT DOCUMENTS

| | | | |
|---|---|---|---|
| 2,996,735 A | 8/1961 | Knocke | |
| 3,425,473 A | 2/1969 | Knowlton | |
| 4,455,044 A | 6/1984 | Musits | |
| 4,604,797 A | 8/1986 | Kitamura | |
| 6,036,421 A | 3/2000 | Demaray | |
| 9,708,079 B2 | 7/2017 | Desjardien | |
| 2002/0164226 A1* | 11/2002 | Hofschneider | F16B 43/00 411/398 |
| 2002/0175104 A1* | 11/2002 | Autterson | C09J 7/35 206/557 |
| 2018/0283687 A1* | 10/2018 | Propheter-Hinckley | F23R 3/06 |

FOREIGN PATENT DOCUMENTS

| | | | | |
|---|---|---|---|---|
| CN | 207539165 U | * | 6/2018 | |
| CN | 207539165 U | | 6/2018 | |
| DE | 202006015879 U1 | | 12/2006 | |
| DE | 102010027876 A1 | * | 10/2011 | F16B 11/006 |
| DE | 102010027876 A1 | | 10/2011 | |
| FR | 2580744 A1 | | 10/1986 | |

(Continued)

OTHER PUBLICATIONS

Singapore office action for SG10202109082Q dated Jul. 27, 2022.
(Continued)

*Primary Examiner* — Victor D Batson
*Assistant Examiner* — Jock Wong
(74) *Attorney, Agent, or Firm* — Getz Balich LLC

(57) ABSTRACT

An assembly is provided that includes a first fastener element and a second fastener element. The first fastener element is secured to the second fastener element with bonding material. The first fastener element may be a spacer such as a washer. The second fastener element may be a fastener or a washer.

12 Claims, 13 Drawing Sheets

(56) References Cited

FOREIGN PATENT DOCUMENTS

FR 2721075 B1 7/1996
GB 2136077 A * 9/1984 .............. F16B 39/24

OTHER PUBLICATIONS

RangerJ, "The Inaccessible Nut", https://www.instructables.com/id/The-Inaccessible-Nut/, Aug. 2012.
Reader's Digest, "The Family Handyman Helpful Hints", Jul. 1998, https://books.google.com/books?id=MZahl_4tyzOQC&pg=PA19&lpg=PA19&dq=glue+washer+to+nut&source=bl&ots=r9b6UnAr_7&sig=ACfU3U2XcsxHIrOqdfV70lxkK8I2_I5JOQ&hl=en&sa=X&ved=2ahUKEwiLoKvhgZjqAhXhIOAKHYcZCvMQ6AEwEXoECAwQAQ#v=onepage&q&f=false.
Swanson, Amazon Customer review "Glue lock nuts to washers prior to install as easier to raise up into place as tight fit." Jan. 14, 2018, https://www.amazon.com/gp/customer-reviews/RSN3R6N6CAP5E?ref_=fspcr_pl_sr_3_5_15_15737511.

* cited by examiner

FASTENER ELEMENT BONDED TO ANOTHER FASTENER ELEMENT

BACKGROUND OF THE DISCLOSURE

1. Technical Field

This disclosure relates generally to a fastening assembly.

2. Background Information

Various types and configurations of fasteners, fastener nuts and fastener washers are known in the art. While these known nuts and washers have various advantages, there is still room in the art for improvement. For example, there is a need in the art for an improved nut and washer assembly which can enable a reduction in assembly time, a reduction in complexity when it comes to assembling components, a reduction in production part count, an increase ease of assembly and blind assembly, support automation, lower disassembly time, minimize tooling and/or reduce loose components.

SUMMARY OF THE DISCLOSURE

According to an aspect of the present disclosure, an assembly is provided that includes a first fastener element and a second fastener element. The first fastener element is secured to the second fastener element with bonding material.

According to another aspect of the present disclosure, another assembly is provided that includes a fastener washer and a fastener nut. The fastener nut is secured to the fastener washer with wax.

According to another aspect of the present disclosure, another assembly is provided that includes a first fastener element, a second fastener element and bonding material. The second fastener element is arranged with the first fastener element. The bonding material secures the second fastener element to the first fastener element. The bonding material includes a first bonding material member and a second bonding material member. The first bonding material member extends along a first longitudinal centerline from a first point on the second fastener element to a point on the first fastener element. The second bonding material member extends along a second longitudinal centerline from a second point on the second fastener element to the point on the first fastener element. The second longitudinal centerline is angularly offset from the first longitudinal centerline.

According to another aspect of the present disclosure, another assembly is provided that includes a first fastener element, a second fastener element and bonding material. The second fastener element is disposed on the first fastener element. The bonding material secures the second fastener element to the first fastener element. The bonding material includes a first member that extends from a point on the second fastener element to a point on the first fastener element. The first member at the point on the second fastener element is separated from the first fastener element by a spatial gap.

According to still another aspect of the present disclosure, another assembly is provided that includes a spacer and a fastener. The fastener projects through a bore of the spacer. A head of the fastener is secured to the spacer with bonding material.

The first fastener element may be configured as or otherwise include a spacer. The second fastener element may be configured as or otherwise include a nut or a fastener.

The spacer may be configured as or otherwise include a fastener washer.

The fastener may be configured as or otherwise include a bolt, a screw, a rivet, a stud or a clevis pin.

The bonding material may be configured as or otherwise include wax.

The wax may be configured as or otherwise include beeswax.

A centerline of an aperture extending through the fastener washer (or the first fastener element) may be laterally offset from a center point of the fastener washer (or the first fastener element).

A centerline of an aperture extending through the fastener washer (or the first fastener element) may be coincident with a center point of the fastener washer (or the first fastener element).

The wax may be disposed at a corner between a surface of the fastener washer (or the first fastener element) and a surface of the fastener washer (or the second fastener element).

The bonding material may not be located directly between and thereby separate the fastener washer (or the second fastener element) and the fastener washer (or the first fastener element).

The surface of the fastener washer (or the first fastener element) may be angularly offset from the surface of the fastener washer (or the second fastener element).

The wax may be configured in a plurality of wax dots about the fastener washer (or the second fastener element). A first of the wax dots may be between, adjacent and spaced from a second of the wax dots and a third of the wax dots.

The wax may be configured in a plurality of wax dots about the fastener washer (or the second fastener element). A first of the wax dots may contact a first surface of the fastener washer (or the second fastener element) and a surface of the fastener washer (or the first fastener element). A second of the wax dots may contact a second surface of the fastener washer (or the second fastener element) and the surface of the fastener washer (or the first fastener element).

The wax may be applied in a truss configuration.

The wax may include a first wax member and a second wax member. The first wax member may extend from a first point on the fastener washer (or the second fastener element) to a point on the fastener washer (or the first fastener element). The second wax member may extend from a second point on the fastener washer (or the second fastener element) to the point on the fastener washer (or the first fastener element).

The fastener washer (or the second fastener element) may include a plurality of peaks arranged circumferentially about a centerline of the fastener washer (or the second fastener element). The first point on the fastener washer (or the second fastener element) may be on a first of the peaks. The second point on the fastener washer (or the second fastener element) may be on a second of the peaks.

A third of the peaks may be between and adjacent the first of the peaks and the second of the peaks.

The point on the fastener washer (or the first fastener element) may be located at an outer peripheral edge of the fastener washer (or the first fastener element).

The wax may include a first wax member that extends from a point on the fastener washer (or the second fastener element) to a point on the fastener washer (or the first fastener element).

The wax may include a first wax member that extends from a point on the fastener washer (or the second fastener element) to a point on the fastener washer (or the first fastener element). The point on the fastener washer (or the second fastener element) may be spaced from the fastener washer (or the first fastener element) by a gap.

The fastener washer (or the first fastener element) may include at least one cooling feature.

The assembly may also include a cartridge, a first washer-nut pair and a second washer-nut pair. The cartridge may include a first locator and a second locator. The first washer-nut pair may be mated with the first locator. The second washer-nut pair may be mated with the second locator. The second washer-nut pair may include the fastener washer and the fastener nut.

The first washer-nut pair may be one of a plurality of first washer-nut pairs mated with the first locator. In addition or alternatively, the second washer-nut pair may be one of a plurality of second washer-nut pairs mated with the second locator.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
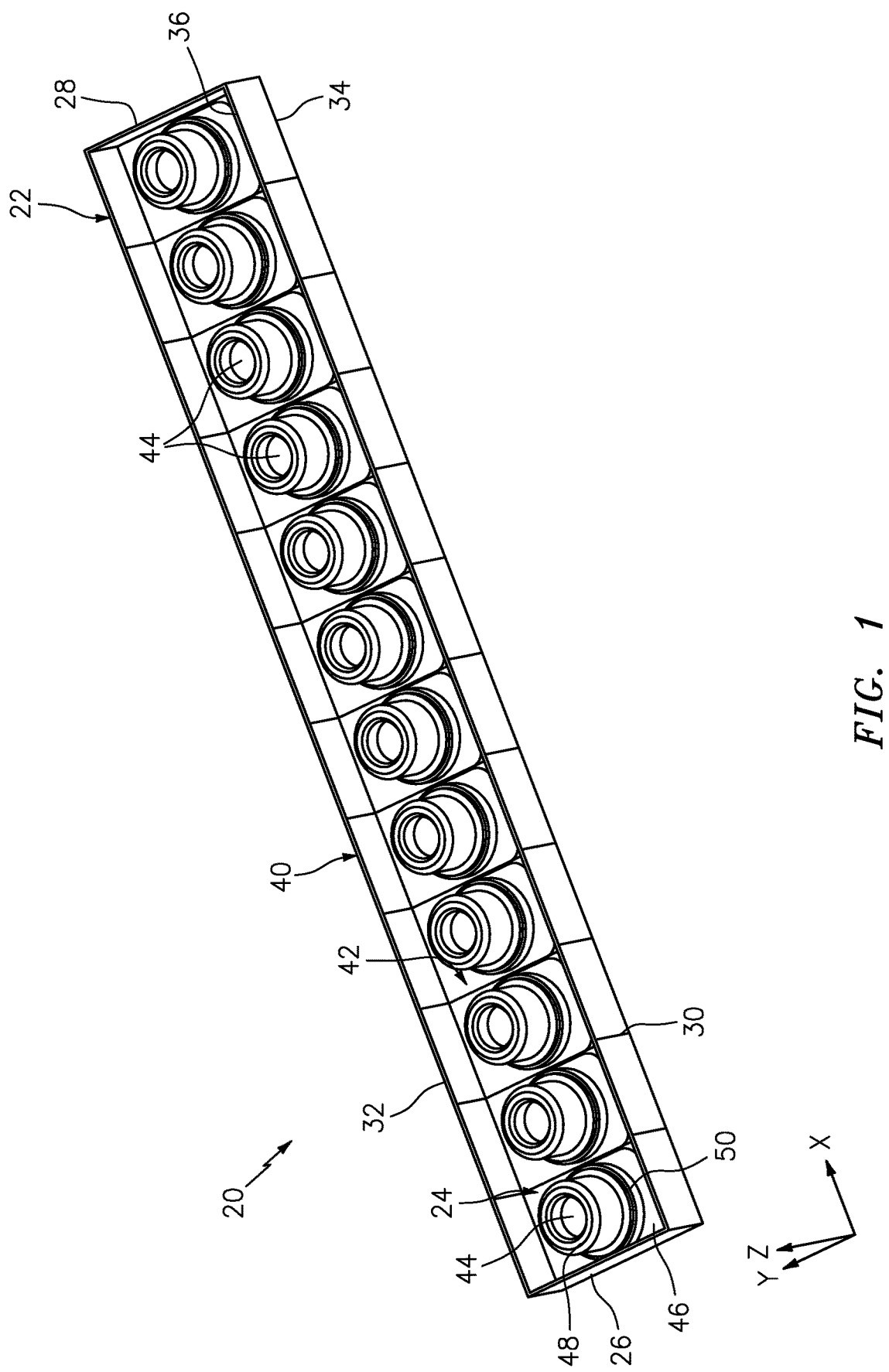
FIG. 1 is a perspective illustration of a fastener assembly.

FIG. 1 is a perspective illustration of a fastener assembly 20. This fastener assembly 20 may be configured for use with an automated part assembly device such as, but not limited to, an automated pick-and-place machine, a multi-axis manipulator or any other robotic device. The present disclosure, however, is not limited to such automated part assembly applications.

The fastener assembly 20 of FIG. 1 includes a cartridge 22 and one or more (e.g., temporary) washer-nut pairs 24. The cartridge 22 is configured to hold the washer-nut pairs 24 in a predetermined arrangement such as, but not limited to, a straight linear array. The cartridge 22 may also be configured to maintain each of the washer-nut pairs 24 in a predetermined orientation.

Figure 2:
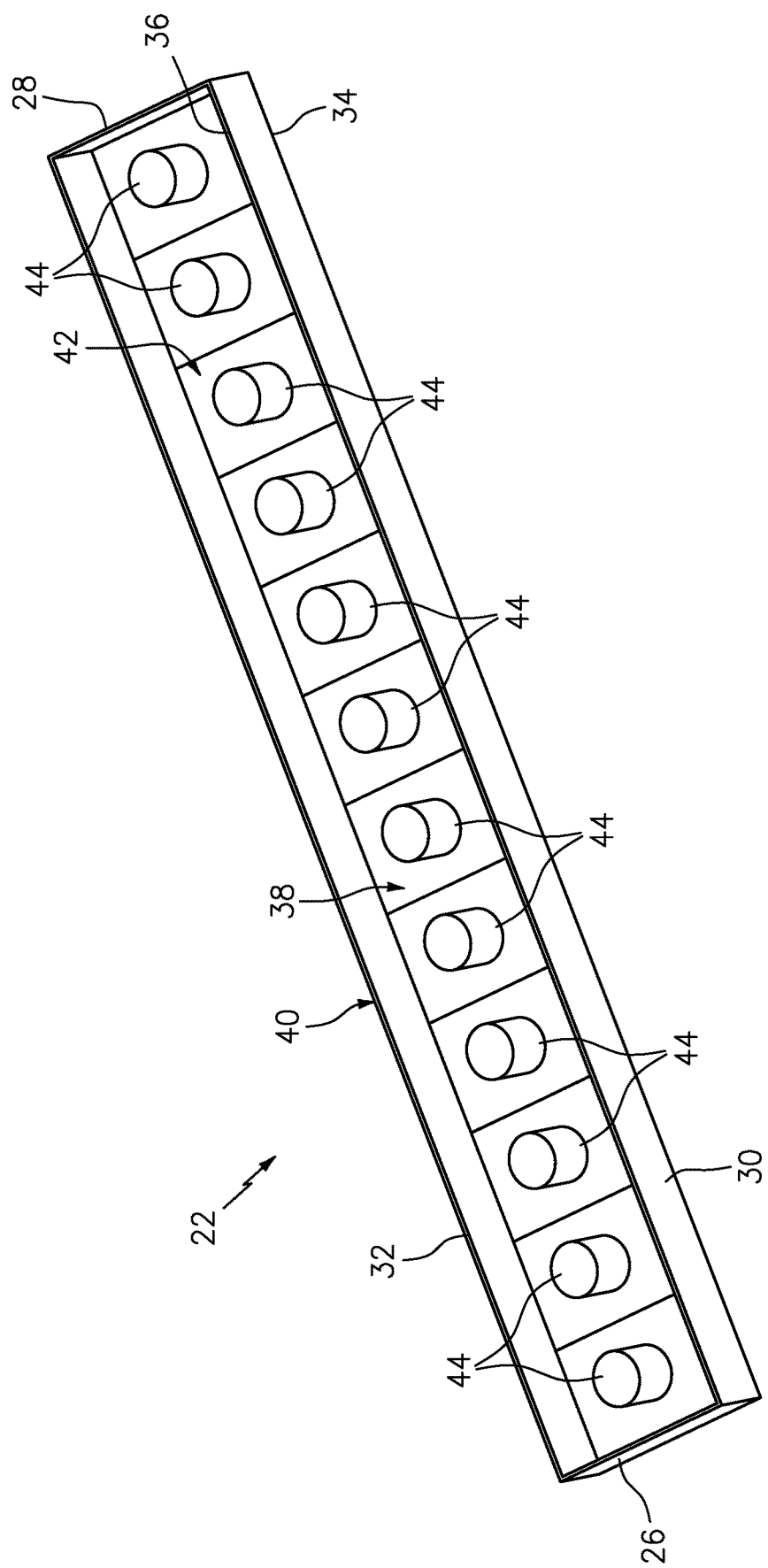
FIG. 2 is a perspective illustration of an empty cartridge.

Referring to FIG. 2, the cartridge 22 extends longitudinally along an x-axis between and to a cartridge first end 26 and a cartridge second end 28 that is opposite the cartridge first end 26. The cartridge 22 extends laterally along a y-axis between and to a cartridge first side 30 and a cartridge second side 32 that is opposite the cartridge first side 30. The cartridge 22 extends vertically along a z-axis between and to a cartridge bottom side 34 and a cartridge top side 36 that is opposite the cartridge bottom side 34.

The cartridge 22 of FIG. 2 includes a cartridge base 38 and a cartridge sidewall 40. The cartridge base 38 is arranged at (e.g., on, adjacent or proximate) the cartridge bottom side 34. The cartridge base 38 extends longitudinally from the cartridge first end 26 to the cartridge second end 28. The cartridge base 38 extends laterally from the cartridge first side 30 to the cartridge second side 32.

The cartridge sidewall 40 may be configured as a full perimeter sidewall. The cartridge sidewall 40 of FIG. 2, for example, extends along and (e.g., completely) around an outer peripheral edge of the cartridge base 38. The cartridge sidewall 40 may thereby be located at and extend along each of the ends 26 and 28 and each of the sides 30 and 32. The cartridge sidewall 40 is connected to (e.g., formed integral with or otherwise attached to) the cartridge base 38. The cartridge sidewall 40 projects vertically out from the cartridge base 38 to a vertical distal edge at the cartridge top side 36.

With the foregoing configuration, the cartridge base 38 and the cartridge sidewall 40 form a cartridge recess 42 within the cartridge 22. This cartridge recess 42 is configured to receive the one or more washer-nut pairs 24 as shown in FIG. 1. The cartridge 22 of FIG. 2, for example, further includes one or more locators 44. Each locator 44 is configured to mate with a respective one of the washer-nut pairs 24; see FIG. 1. Each locator 44 of FIG. 2, for example, is configured as a protrusion such as, but not limited to, a (e.g., cylindrical) post. Each locator 44 is disposed within the cartridge recess 42 and connected to (e.g., formed integral with or otherwise attached to) the cartridge base 38. Each locator 44 projects vertically out from the cartridge base 38 to a respective vertical locator distal end, which may be at or towards the cartridge top side 36.

Figure 3:
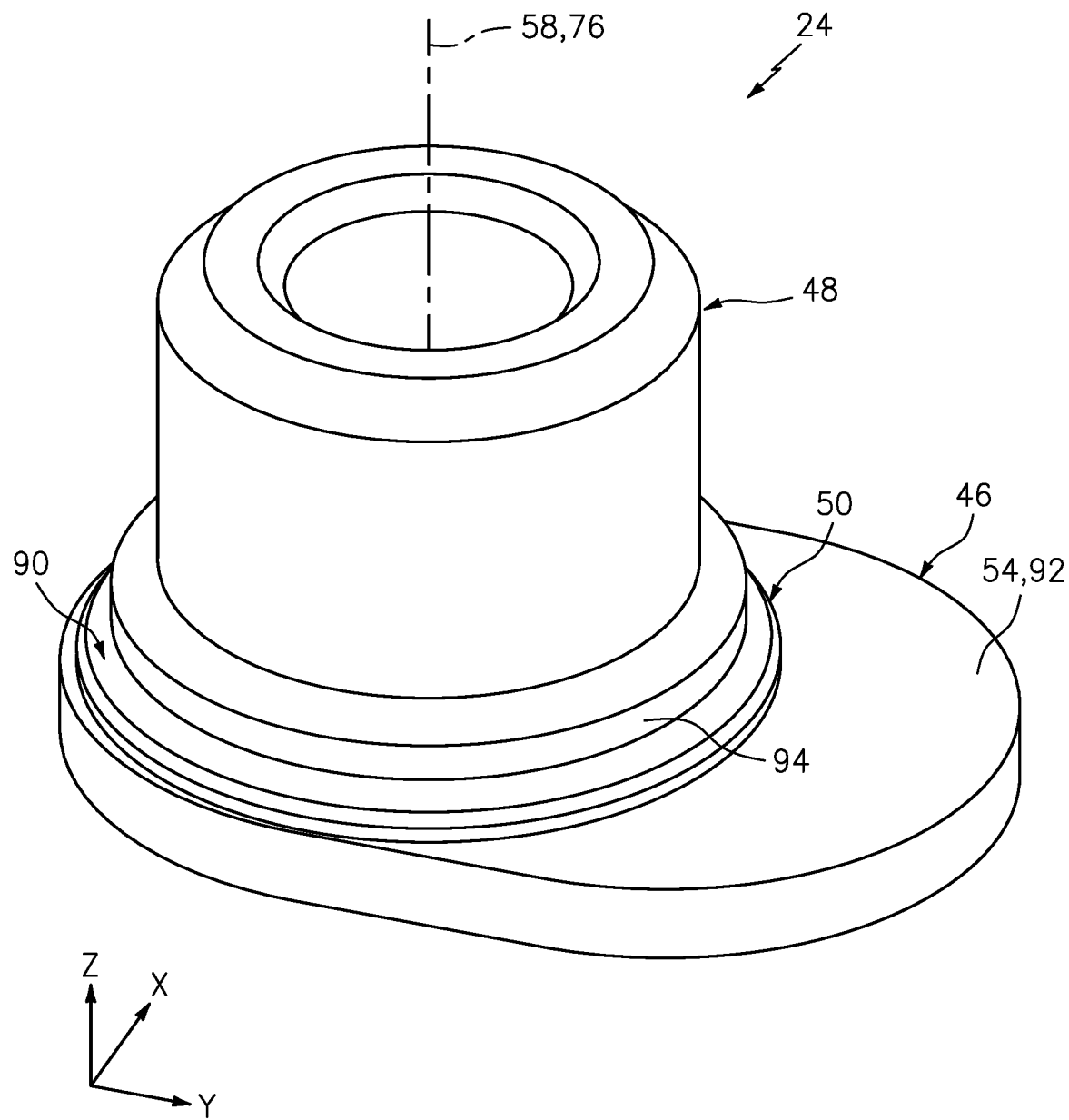
FIG. 3 is a perspective illustration of a washer-nut pair including a fastener washer, a fastener nut and bonding material.

Referring to FIG. 3, each of the washer-nut pairs 24 includes a fastener washer 46 (e.g., a flat washer, a lock washer or any other type of annular spacer) and a fastener nut 48. Each of the washer-nut pairs 24 also includes bonding material 50 for (e.g., temporarily) securing the fastener nut 48 to the fastener washer 46.

Figure 4:
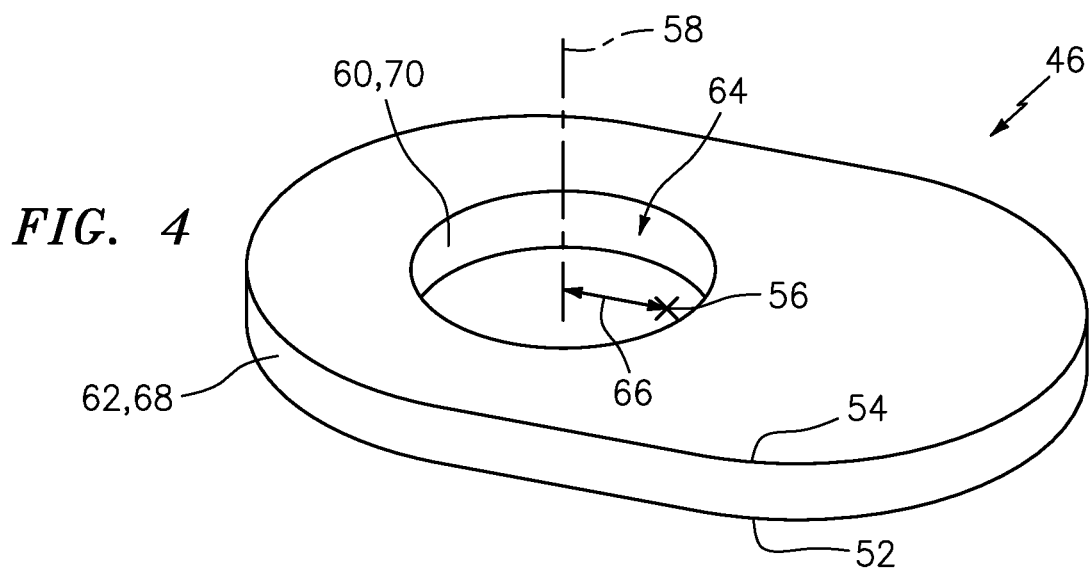
FIG. 4 is a perspective illustration of the fastener washer with a first configuration.

Referring to FIG. 4, the fastener washer 46 is configured with a generally annular body. The fastener washer 46 of FIG. 4, for example, extends vertically between a washer bottom side 52 and a washer top side 54 that is opposite the washer bottom side 52. The fastener washer 46 has a center point 56 (e.g., a centroid, center or mass). The fastener washer 46 extends circumferentially about (e.g., completely around) the center point 56. The fastener washer 46 extends radially relative to a centerline axis 58 between a washer inner side 60 and a washer outer side 62 that is opposite the washer inner side 60. The washer inner side 60 forms a washer aperture 64 in the fastener washer 46. This washer aperture 64 extends along its centerline axis 58 through the fastener washer 46 and between the washer bottom side 52 and the washer top side 54.

Figure 5:
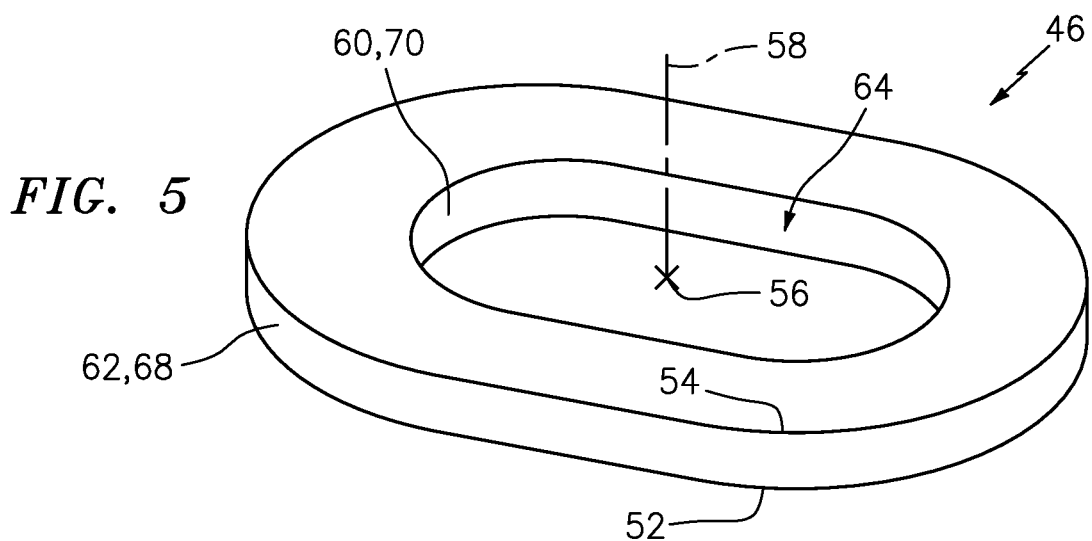
FIG. 5 is a perspective illustration of the fastener washer with a second configuration.
Figure 6:
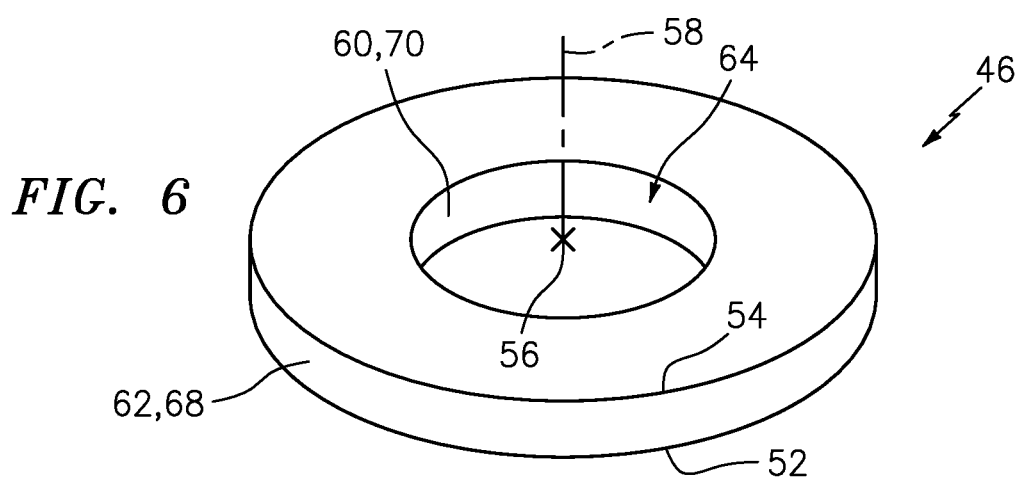
FIG. 6 is a perspective illustration of the fastener washer with a third configuration.

The centerline axis 58 of the washer aperture 64 of FIG. 4 is (e.g., laterally and/or longitudinally) offset from the center point 56 of the fastener washer 46 by a non-zero distance 66. Thus, the centerline axis 58 is not coincident with the center point 56. However, in other embodiments, the centerline axis 58 of the washer aperture 64 may extend through the center point 56 of the fastener washer 46 as shown, for example, in FIGS. 5 and 6. Thus, the centerline axis 58 may alternatively be coincident with the center point 56.

The fastener washer 46 of FIG. 4 is configured with a non-circular outer peripheral geometry when viewed, for example, in a plane parallel with one of the washer sides 52 and/or 54. An outer peripheral surface 68 of the fastener washer 46 at the washer outer side 62, for example, may have a racetrack shape as shown in FIG. 4. Other examples of the non-circular outer peripheral geometry include, but are not limited to, an oval shape, an elliptical shape and a polygonal shape (e.g., a rectangular shape, etc.). The present disclosure, however, is not limited to such non-circular outer peripheral geometries. For example, referring to FIG. 6, the outer peripheral surface 68 of the fastener washer 46 at the washer outer side 62 may alternatively have a circular shape.

Referring again to FIG. 4, the fastener washer 46 may be configured with a circular inner peripheral geometry. An inner peripheral surface 70 of the fastener washer 46 at the washer inner side 60, for example, may have a circular shape as shown in FIG. 4. The present disclosure, however, is not limited to such a circular inner peripheral geometry. For example, referring to FIG. 5, the inner peripheral surface 70 at the washer inner side 60 may alternatively have a non-circular shape.

Figure 7:
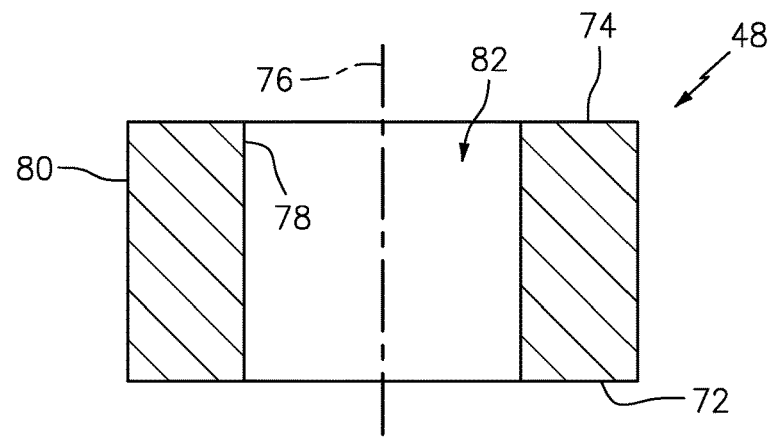
FIG. 7 is a side sectional illustration of the fastener nut.
Figure 8:
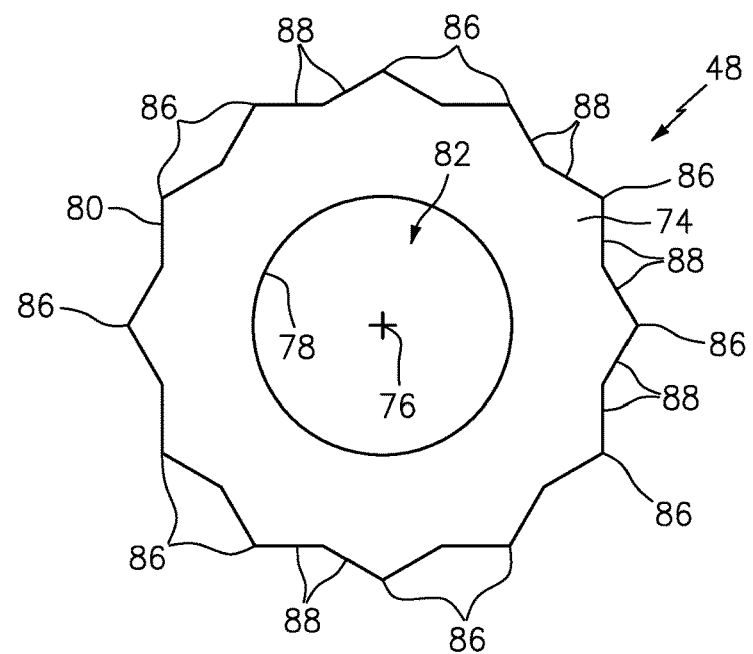
FIG. 8 is a top view illustration of the fastener nut with a first configuration.

Referring to FIG. 7, the fastener nut 48 is configured with a generally annular body. The fastener nut 48 of FIG. 7, for example, extends vertically between a nut bottom side 72 and a nut top side 74 that is opposite the nut bottom side 72. Referring to FIG. 8, the fastener nut 48 has a centerline axis 76. The fastener nut 48 extends circumferentially about (e.g., completely around) the centerline axis 76. The fastener nut 48 extends radially relative to its centerline axis 76 between a nut inner side 78 and a nut outer side 80 that is opposite the nut inner side 78. The nut inner side 78 forms a (e.g., threaded) nut bore 82 in the fastener nut 48. The nut bore 82 of FIGS. 7 and 8 extends along its centerline axis 76 through the fastener nut 48 and between the nut bottom side 72 and the nut top side 74.

Figure 11:
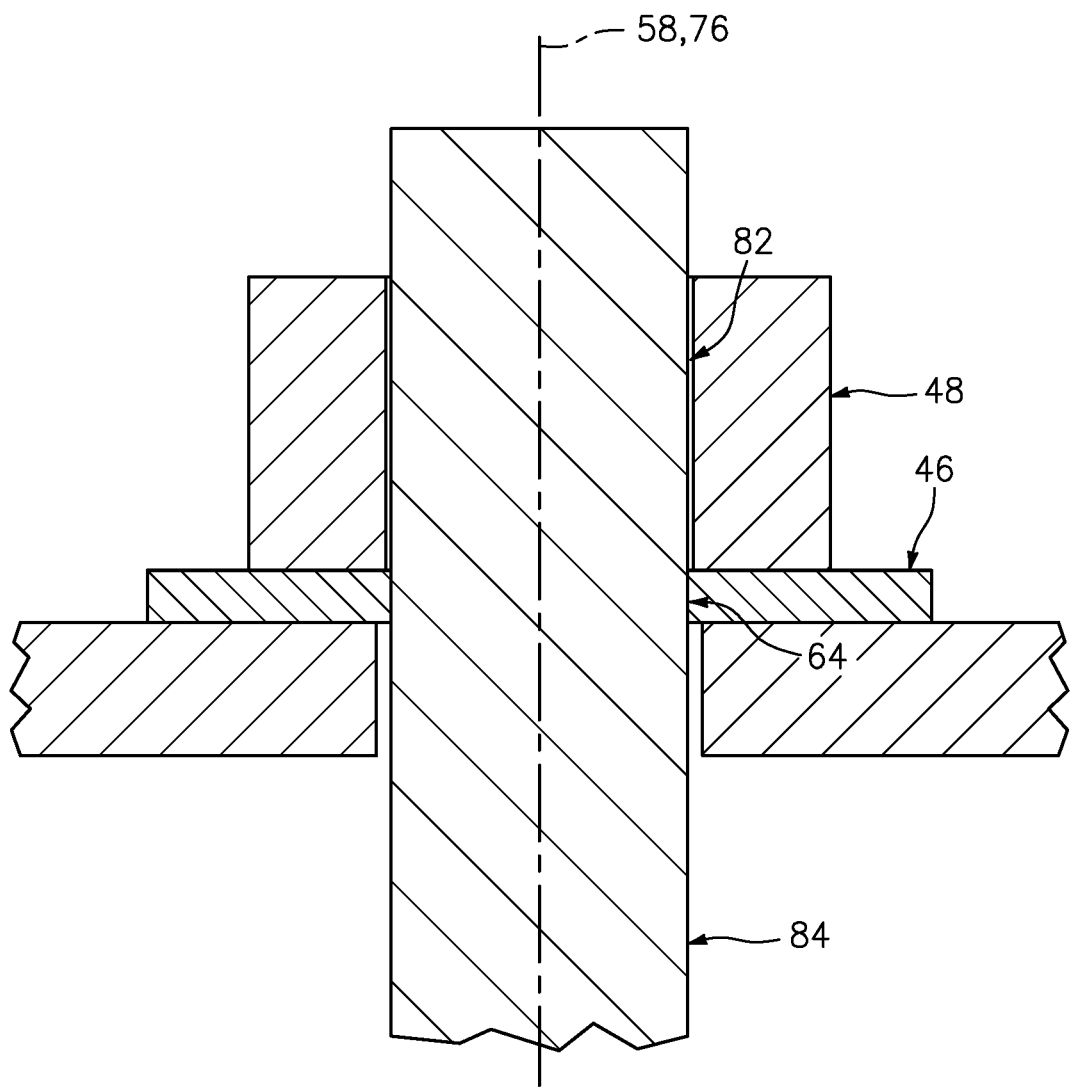
FIG. 11 is a side sectional illustration of the fastener nut and the fastener washer arranged adjacent a structure and mated with a fastener.

The fastener nut 48 is configured to mate with a fastener 84 (see FIG. 11) such as, but not limited to, a threaded bolt, a threaded stud, etc. The fastener nut 48, for example, is configured to receive a threaded portion of the fastener 84 in its nut bore 82.

Figure 9:
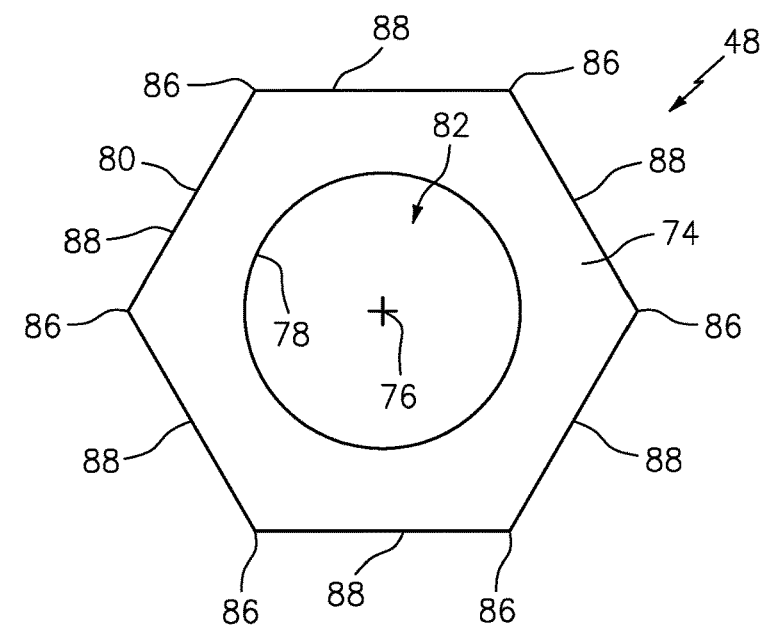
FIG. 9 is a top view illustration of the fastener nut with a second configuration.

The fastener nut 48 of FIG. 8 is configured as a multi-point bolt nut. An outer periphery of the fastener nut 48 at its nut outer side 80, for example, is configured with a polygonal cross-sectional geometry when viewed, for example, in a plane perpendicular to the centerline axis 76 of the fastener nut 48 and its bore 82; e.g., plane of FIG. 8. This polygonal cross-sectional geometry may be a bi-hexagonal cross-sectional geometry (e.g., the fastener nut 48 may be a 12 point nut) as shown in FIG. 8. In other embodiments, however, the polygonal cross-sectional geometry may alternatively be a hexagonal cross-sectional geometry (e.g., the fastener nut 48 may be a 6 point nut) as shown in FIG. 9, or any other suitable cross-sectional geometry. The fastener nut 48 of FIG. 8 is configured with a plurality of points 86 (e.g., peaks) arranged circumferentially about its centerline axis 76. Each of these points 86 is formed by a peak (e.g., an edge) at a respective radially outer intersection between two circumferentially adjacent (e.g., planar) outer surfaces 88 of the fastener nut 48. In the embodiment of FIG. 8, each point 86 is relatively sharp. However, in other embodiments, one or more of the points 86 may alternatively be, for example, slightly rounded.

Referring again to FIG. 3, the fastener nut 48 is arranged with the fastener washer 46. The fastener nut 48, for example, may be placed on and vertically engage (e.g., contact) the fastener washer 46. The nut bottom side 72 (see FIG. 7), for example, may vertically engage (e.g., contact) the washer top side 54. In addition, the nut bore 82 may be aligned with the washer aperture 64 (see FIGS. 4 and 11). The centerline axis 76 of the nut bore 82, for example, may be arranged coaxial with the centerline axis 58 of the washer aperture 64.

To maintain the fastener nut 48 with the fastener washer 46 in the above arrangement (a nut-washer arrangement), the fastener nut 48 is secured to the fastener washer 46 with the bonding material 50.

The bonding material 50 may be configured to temporarily secure the fastener nut 48 to the fastener washer 46. The term "temporary" may describe a bond which may be broken when the bonding material 50 is subject to a predetermined condition; e.g., a torque equal to or more than a predetermined torque and/or a temperature equal to or more than a predetermined temperature, etc. By temporarily securing the fastener nut 48 to the fastener washer 46, the bonding material 50 may enable maintenance of the nut-washer arrangement until, for example, the fastener nut 48 is torqued onto a respective fastener 84 (see FIG. 11). In other words, the bonding material 50 may enable maintenance of the nut-washer arrangement while the washer-nut pairs 24 are held in the cartridge 22 and/or while each washer-nut pair 24 is picked up, moved and then placed with, for example, an automated pick-and-place machine. However, once the fastener nut 48 is being torqued onto a respective fastener 84 (see FIG. 11), the bond of the bonding material 50 may break and enable the fastener nut 48 to rotate about its centerline axis 76 independent of rotation of the fastener washer 46.

The bonding material 50 is configured to break, de-bond and/or displace through, for example, a mechanical or thermal action. For example, the bonding material 50 may be configured to break, de-bond and/or displace when the fastener nut 48 is torqued as described below. Thus, the bonding material 50 may not interfere with the functionality of the fastener nut 48 and the fastener washer 46; e.g., to hold an engine assembly together tightly through engine operation or cooling.

The bonding material 50 may also be configured to disintegrate when exposed to a certain environment. The bonding material 50, for example, may be configured to disintegrate (e.g., burn off) when exposed to an elevated temperature. In some embodiments, the disintegration of the bonding material 50 may result in leaving no trace of bonding material 50 or disintegrated forms (e.g., solid or liquid residual products) thereof behind. For example, the bonding material 50 may be configured to vaporize (e.g., burn off) when exposed to an elevated temperature such that bonding material vapors are carried away from the installed washer-nut pair 24. Such a complete removal of the bonding material 50 may be particularly useful in applications when byproducts from the bonding material 50 could otherwise interfere with other elements of a device; e.g., cooling holes, etc.

To achieve one or more of the foregoing attributes, the bonding material 50 may be configured as wax; e.g., beeswax. However, other bonding materials 50 are also contemplated such as, but not limited to, adhesives and glues. Examples of adhesives and glues include, but are not limited to, superglue, epoxy, etc.

Referring again to FIG. 1, each of the washer-nut pairs 24 is arranged with the cartridge 22. Each of the washer-nut pairs 24, for example, may be disposed in the cartridge recess 42 and mated with a respective one of the locators 44. Each locator 44 may project vertically into (or through) the washer aperture 64 (see FIG. 4). Each locator 44 may also project vertically into or through the nut bore 82.

Figure 10:
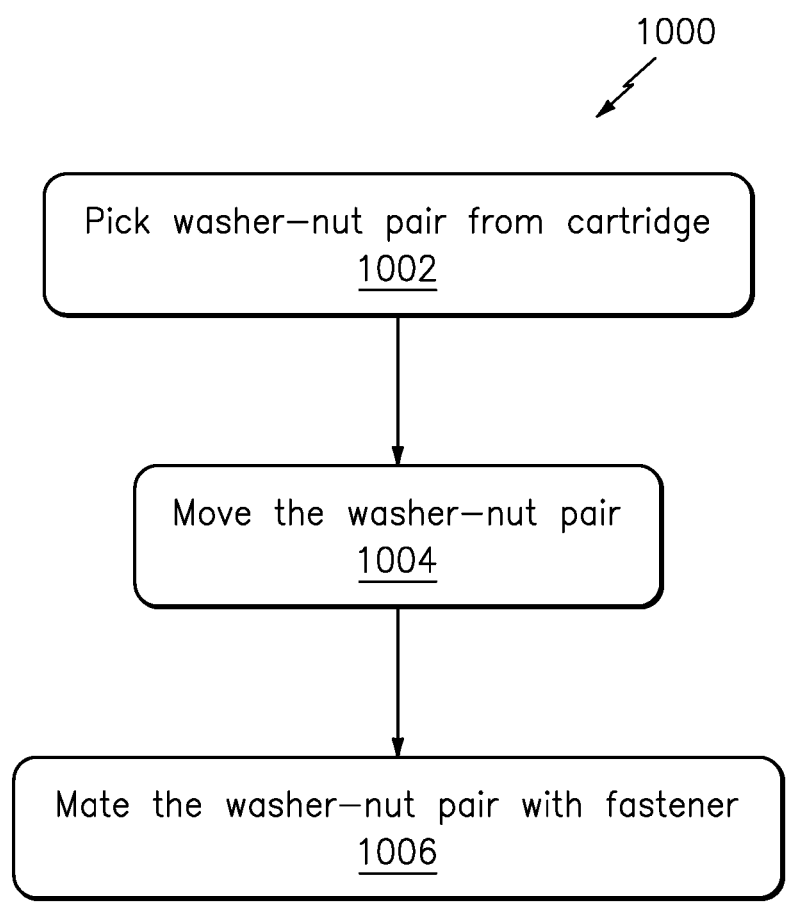
FIG. 10 is a flow diagram of a method for assembling an apparatus.

FIG. 10 is a flow diagram of a method 1000 for assembling an apparatus. During step 1002, an automated part assembly device picks up at least one of the washer-nut pairs 24 from the cartridge recess 42 (see FIG. 1). In step 1004, the automated part assembly device moves each washer-nut pair 24 to another location for mating with a respective fastener 84 (see FIG. 11). In step 1006, the automated part assembly device mates each washer-nut pair 24 with the respective fastener 84 and torques the fastener nut 48 to a predetermined torque (see FIG. 11). Notably, by temporarily mating each fastener nut 48 with the respective fastener washer 46, the automated part assembly device reduces its number of movements by one half (½) as compared to if the automated part assembly device had to move each fastener washer 46 independent of each fastener nut 48.

The bonding material 50 may be applied to the components 46 and 48 with various different configurations. Referring to FIG. 3, for example, the bonding material 50 may be applied to the fastener nut 48 and to the fastener washer 46 at an interface between the fastener nut 48 and the fastener washer 46. The bonding material 50, for example, may be disposed in a bead 90 along at a corner between the perpendicular or otherwise angularly offset surfaces 92 and 94. This bead 90 may extend completely or partially around the fastener nut 48. However, the bonding material 50 is typically not disposed vertically between the components 46 and 48 as such an intermediate layer of bonding material 50 may prevent direct contact between the fastener nut 48 and the fastener washer 46. As a result, the fastener nut 48 may become loose after the bonding material 50 is removed via, for example, disintegration.

Figure 12:
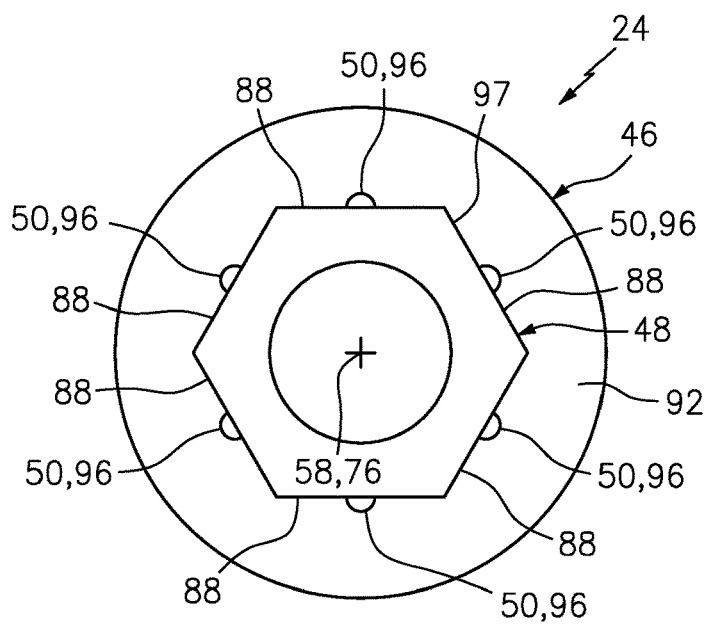
FIGS. 12-14 are top view illustrations of the washer-nut pair with various configurations of the bonding material.
Figure 13:
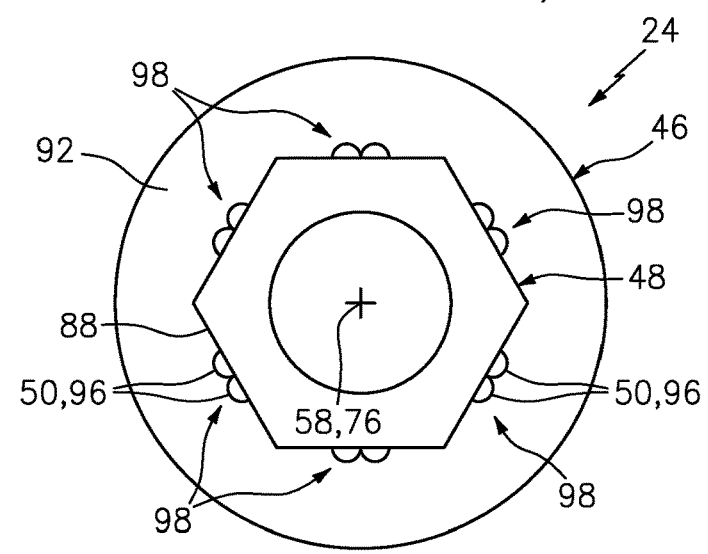

Referring to FIG. 12, in some embodiments, the bonding material 50 may be applied via a plurality of bonding material dots 96; e.g., wax or adhesive dots. Each of these dots 96 may be disposed at a corner 97 between the fastener nut 48 and the fastener washer 46. For example, each of the dots 96 may contact and be bonded to the washer surface 92 and a respective one of the nut surfaces 88. In the embodiment of FIG. 12, the dots 96 are configured as discrete dots. Each dot 96, more particularly, is arranged between and adjacent (e.g., directly neighboring, circumferentially next to) two other dots 96, but spatially isolated/spaced from those adjacent dots 96. However, in other embodiments, multiple dots 96 may be clustered together along each respective surface as shown in FIG. 13, where each cluster 98 of dots 96 may be spatially isolated/spaced from adjacent clusters 98 of dots 96.

Figure 14:
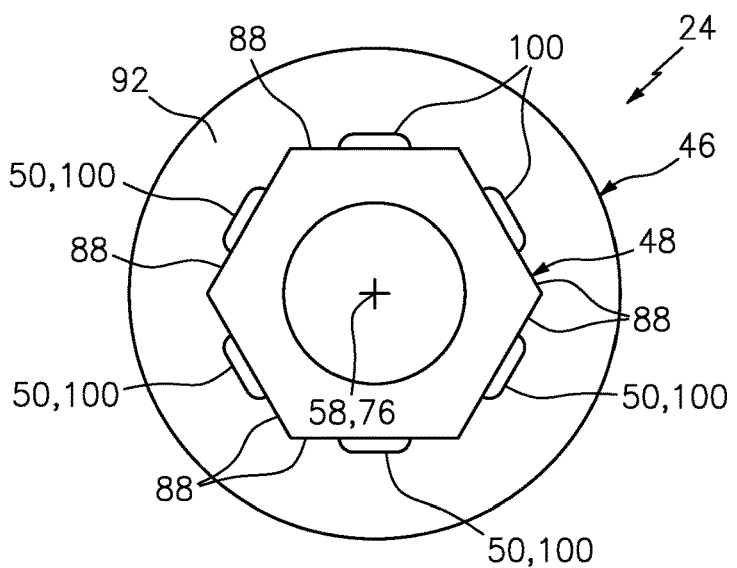

Each dot 96 may be configured as a substantially uniform glob (e.g., drop, point, partial hemisphere, etc.) of bonding material 50. However, in other embodiments, one or more of the dots 96 may each be replaced with a line 100 (e.g., a bead) of the bonding material 50 as shown, for example, in FIG. 14. Each line 100 may extend partially or completely along a respective one of the nut surfaces 88.

Figure 15A:
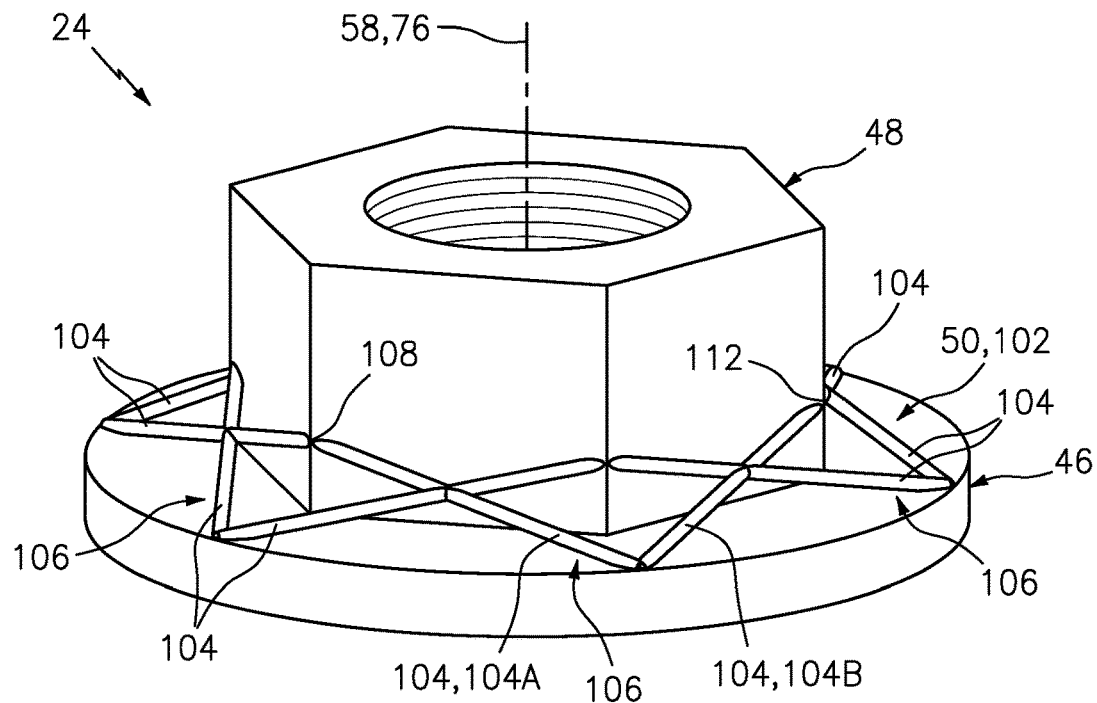
FIG. 15A is a perspective illustration of the washer-nut pair with another configuration of the bonding material.
Figure 15B:
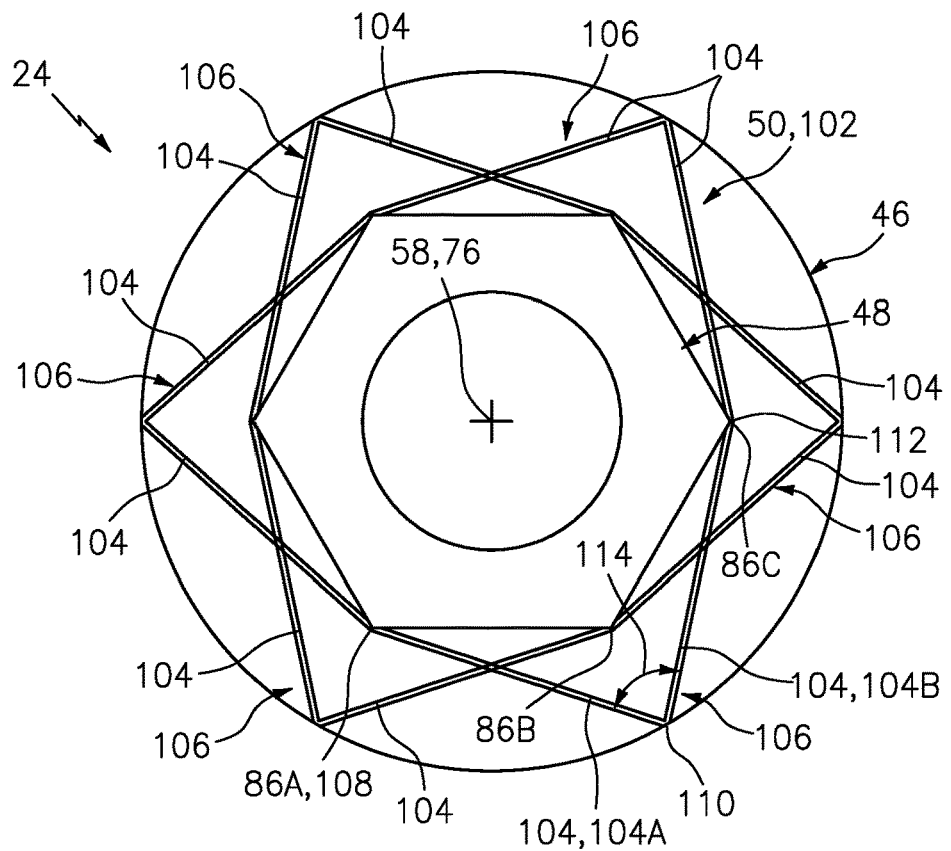
FIG. 15B is a top view illustration of the washer-nut pair of FIG. 15A.

Referring to FIGS. 15A and 15B, in some embodiments, the bonding material 50 may be applied in a truss (e.g., a lattice) configuration; e.g., the bonding material 50 may form a truss 102; e.g., a lattice or other structure. The bonding material 50, for example, may include a plurality of bonding material members 104; e.g., chords, webs, struts, legs, arms, etc. These members 104 may be arranged in a plurality of groupings 106 (e.g., pairs), where each grouping 106 of FIG. 15B includes a first member (e.g., see 104A) and a second member (e.g., see 104B). The first member 104A extends along a respective (e.g., straight) first member centerline between and to a first point 108 on the fastener nut 48 and a point 110 on the fastener washer 46. The second member 104B extends along a respective (e.g., straight) second member centerline between and to a second point 112 of the fastener nut 48 and the point 110 on the fastener washer 46. The second point 112 is spatially separated (e.g., circumferentially) from the first point 108 such that the second member centerline is angularly offset from the first member centerline by an acute angle 114. The second point 112 may be vertically aligned with (or offset from) the first point 108.

In some embodiments, the point 110 on the fastener washer 46 for a respective grouping 106 may be located at the outer periphery of the fastener washer 46. However, in other embodiments, the point 110 may be located intermediately between the outer periphery of the fastener washer 46 and the fastener nut 48.

In some embodiments, the first point 108 on the fastener nut 48 for a respective grouping 106 may be located at and/or vertically along a first of the points 86 (e.g., peak 86A). The second point 112 on the fastener nut 48 for the respective grouping may be located at and/or vertically along a second of the points 86 (e.g., peak 86C), where the second of the points (e.g., 86C) is different than the first of the points (e.g., 86A). The second of the points (e.g., 86C), for example, may be separated from the first of the points (e.g., 86A) by a single other one of the points (e.g., 86B). This other point (e.g., 86B), however, may be associated with the first point of another (e.g., adjacent, neighboring) one of the groupings 106.

In some embodiments, referring to FIG. 15A, the first point 108 and/or the second point 112 on the fastener nut 48 for a respective grouping 106 may be spaced/separated from the fastener washer 46 by a non-zero vertical distance. Thus, the first member (e.g., 104A) at the first point 108 and/or the second member (e.g., 104B) at the second point 112 may also be spaced/separated from the fastener washer 46. The present disclosure, however, is not limited to such an exemplary vertical displacement arrangement.

Figure 16:
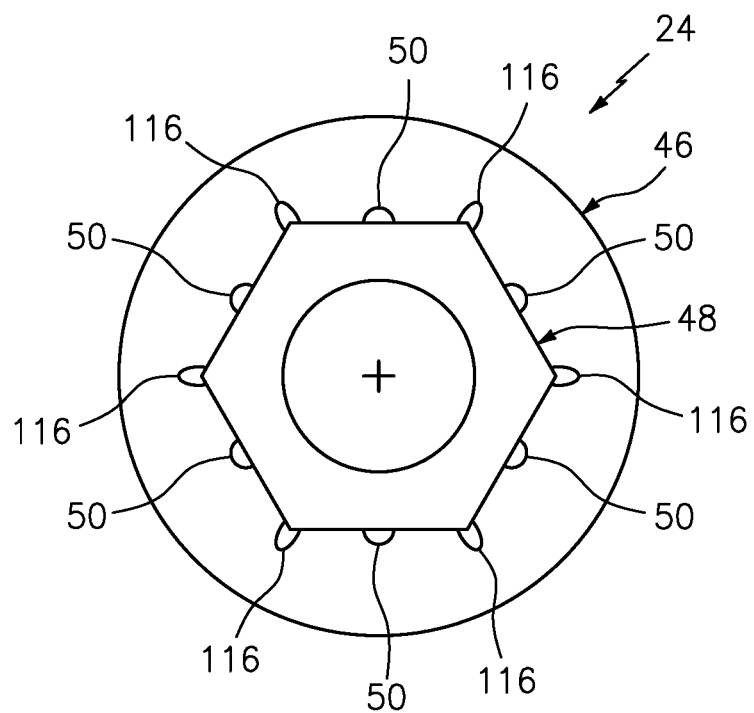
FIG. 16 is a top view illustration of the washer-nut pair configured with one or more cooling features.

Referring to FIG. 16, in some embodiments, the fastener washer 46 may include one or more cooling features 116. Examples of the cooling features 116 include, but are not limited to, apertures (e.g., slots, channels, through holes, etc.) and projections (e.g., fins, ribs, etc.).

Figure 17:
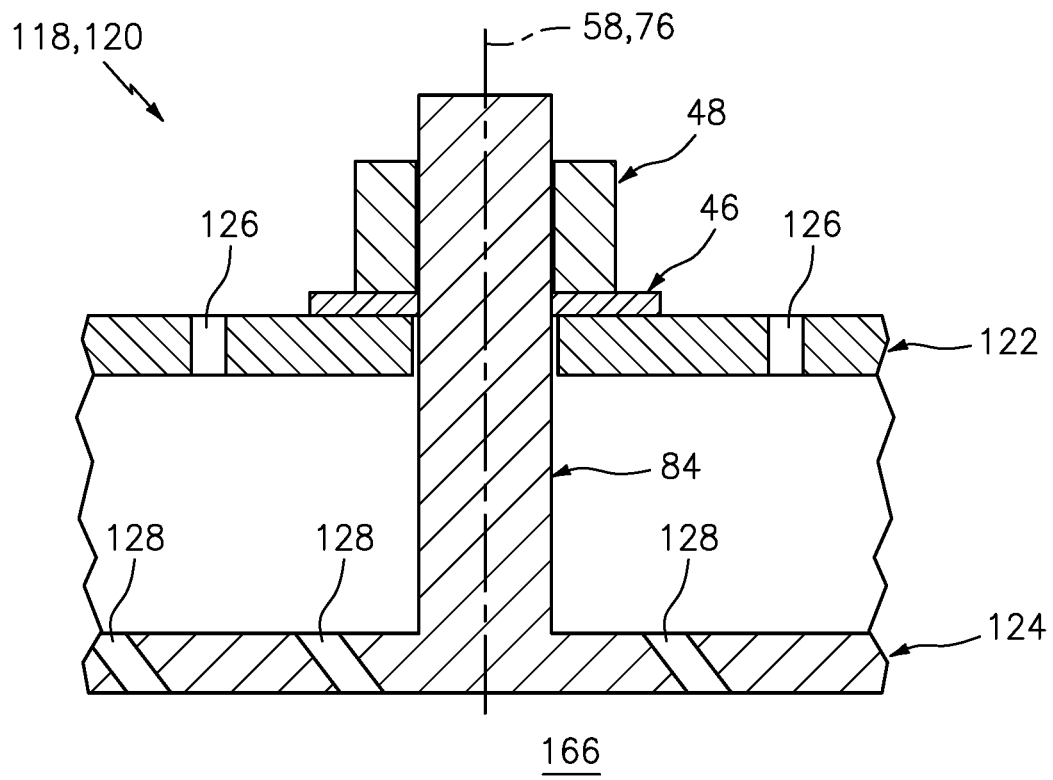
FIG. 17 is a side sectional illustration of a multi-walled structure.

FIG. 17 illustrates a portion of a multi-walled structure 118 such as, but not limited to, a combustor wall of a combustor 120. The multi-walled structure 118 of FIG. 17 includes a shell 122 and a heat shield 124, which may also be referred to as a liner. The heat shield 124 is connected to the shell 122 by one or more fasteners 84; e.g., studs. Each fastener 84 may be connected to the heat shield 124. Each fastener 84 may project through a fastener aperture in the shell 122. A distal end portion of each fastener 84 may then be mated with a respective one of the fastener washers 46 and a respective one of the fastener nuts 48, for example, using the method 1000 of FIG. 10. By selecting the bonding material 50 (e.g., wax) to disintegrate (e.g., vaporize) when exposed to an elevated temperature (e.g., during combustor break in), the bonding material 50 may be (e.g., completely) removed as shown in FIG. 17 with reduced or substantially no possibility of interfering with a nearby feature 126 and 128; e.g., clogging a nearby cooling aperture in the shell 122 and/or heat shield 124.

Figure 18:
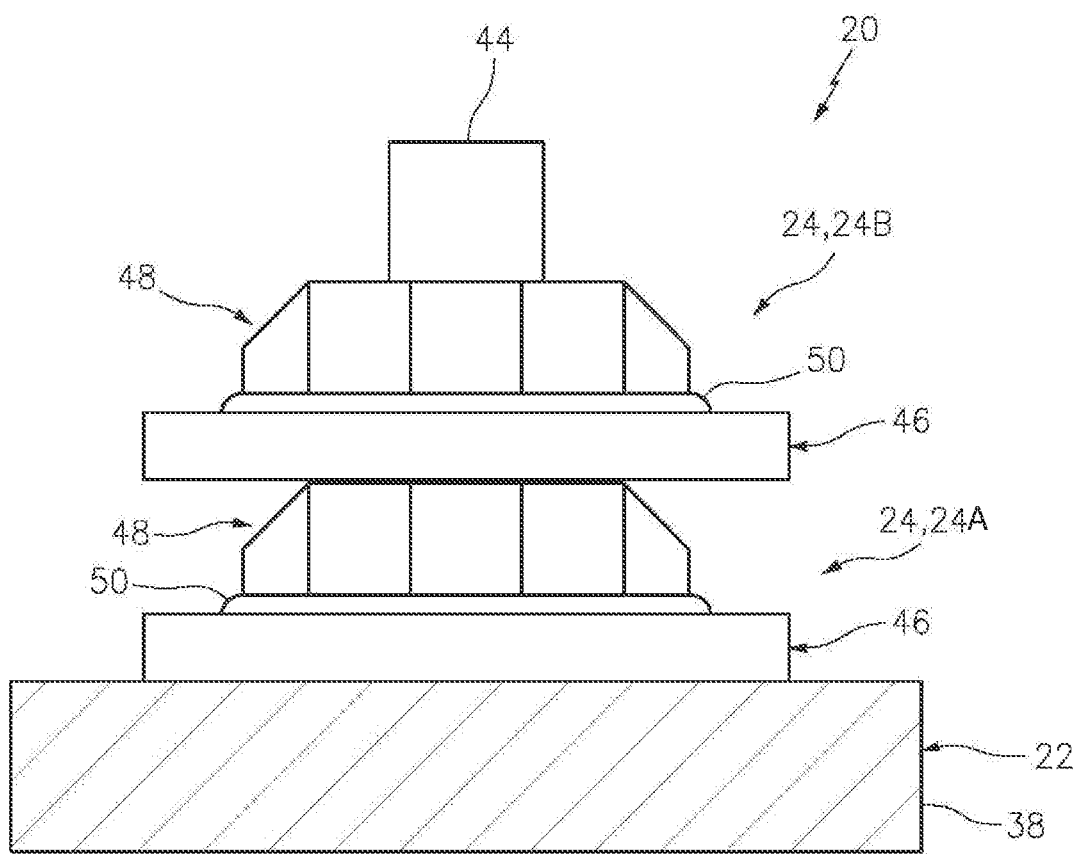
FIG. 18 is a sectional illustration of the fastener assembly where multiple washer-nut pairs are mated with each locator.

In some embodiments, referring to FIG. 18, multiple washer-nut pairs 24 may be mated with, for example, each respective locator 44. For example, a second of the washer-nut pairs 24B may be stacked on top of a first of the washer-nut pairs 24A. The washer 46 of the first washer-nut pair 24A may thereby engage (e.g., contact) the cartridge base 38, whereas the washer 46 of the second washer-nut pair 24B may engage (e.g., contact) the nut 48 of the first washer-nut pair 24A there below.

Figure 19:
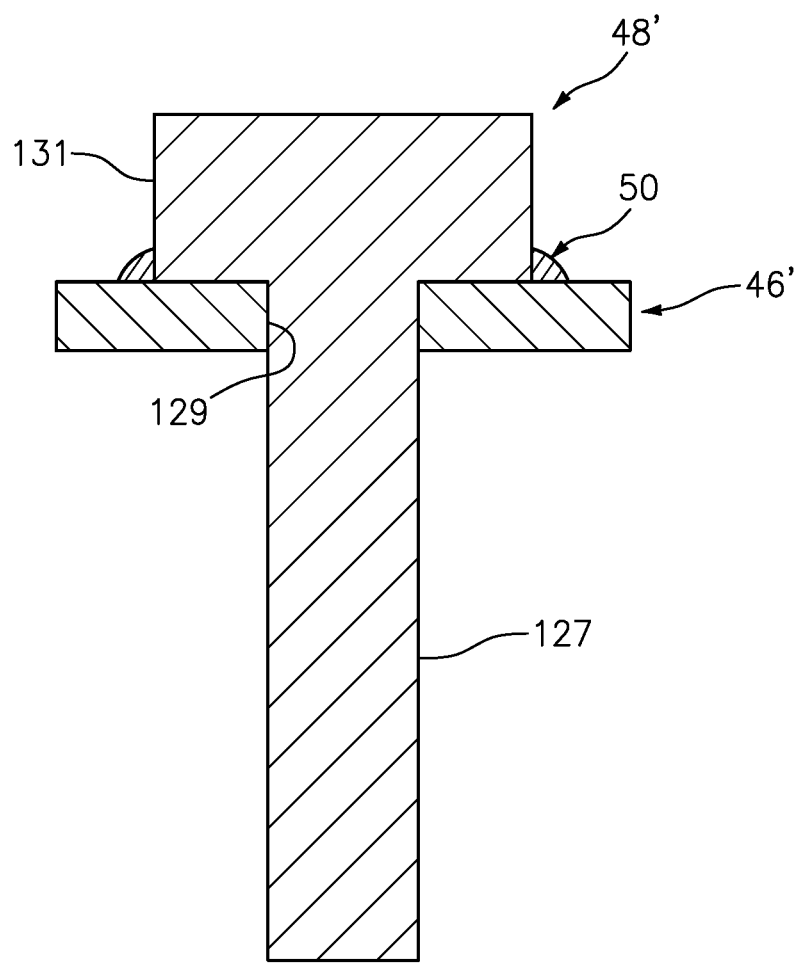
FIG. 19 is a side sectional illustration of a first fastener element mated with and secured to a second fastener element.

It is contemplated that a fastener element besides a fastener nut (e.g., the fastener nut 48) may alternatively be (e.g., temporarily) secured to another fastener element (e.g., the fastener washer 46 or any other type of spacer) using the various methodologies/techniques/bonding materials described above. For example, referring to FIG. 19, a first fastener element 48' may be (e.g., temporarily) secured to a second fastener element 46'. The first fastener element 48' may be configured as a fastener such as, but not limited to, a bolt, a screw, a rivet, a stud, a clevis pin, etc. The second fastener element 46' may be configured as a (e.g., annular) spacer such as, but not limited to, a flat washer or a lock washer. The first fastener element 48' is mated with the second fastener element 46'. A shaft 127 of the first fastener element 48', for example, may project through a bore 129 of the second fastener element 46', where a head 131 or base of the first fastener element 48' engages (e.g., contacts) the second fastener element 46'. The bonding material 50 may then be used to (e.g., temporarily) secure the first fastener element 48' to the second fastener element 46' using, for example, any one or more of the techniques discussed above.

Figure 20:
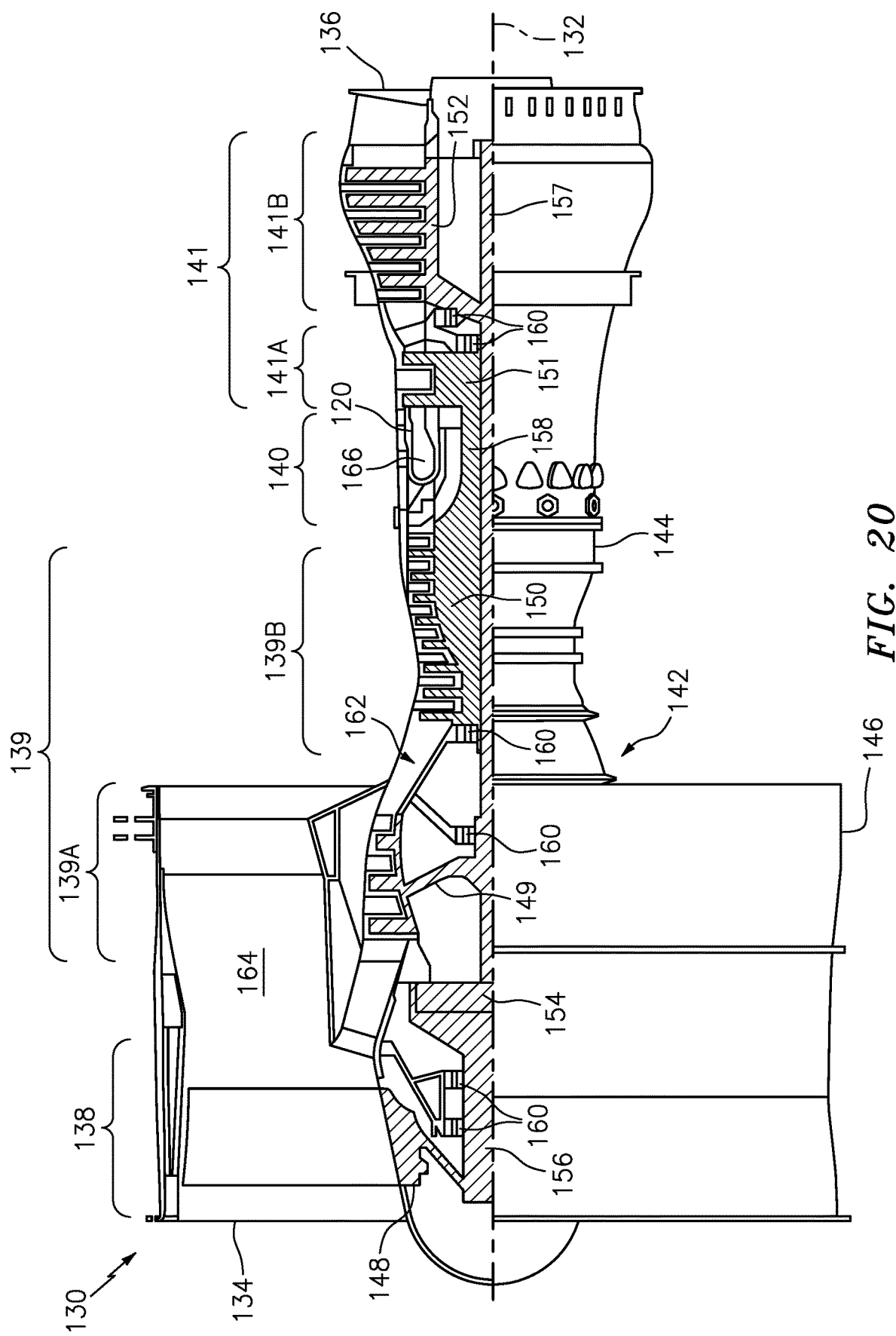
FIG. 20 is a side cutaway illustration of a turbofan gas turbine engine.

FIG. 20 is a side cutaway illustration of a geared turbine engine 130 with which the combustor 120 and/or the washer-nut pairs 24 may be configured. This turbine engine 130 extends along an axial centerline 132 between an upstream airflow inlet 134 and a downstream airflow exhaust 136. The turbine engine 130 includes a fan section 138, a compressor section 139, a combustor section 140 and a turbine section 141. The compressor section 139 includes a low pressure compressor (LPC) section 139A and a high pressure compressor (HPC) section 139B. The turbine section 141 includes a high pressure turbine (HPT) section 141A and a low pressure turbine (LPT) section 141B.

The engine sections 138-141B are arranged sequentially along the axial centerline 132 within an engine housing 142. This engine housing 142 includes an inner case 144 (e.g., a core case) and an outer case 146 (e.g., a fan case). The inner case 144 may house one or more of the engine sections 139A-141B; e.g., an engine core. The outer case 146 may house at least the fan section 138.

Each of the engine sections 138, 139A, 139B, 141A and 141B includes a respective rotor 148-152. Each of these rotors 148-152 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 148 is connected to a gear train 154, for example, through a fan shaft 156. The gear train 154 and the LPC rotor 149 are connected to and driven by the LPT rotor 152 through a low speed shaft 157. The HPC rotor 150 is connected to and driven by the HPT rotor 151 through a high speed shaft 158. The shafts 156-158 are rotatably supported by a plurality of bearings 160; e.g., rolling element and/or thrust bearings. Each of these bearings 160 is connected to the engine housing 142 by at least one stationary structure such as, for example, an annular support strut.

During operation, air enters the turbine engine 130 through the airflow inlet 134. This air is directed through the fan section 138 and into a core gas path 162 and a bypass gas path 164. The core gas path 162 extends sequentially through the engine sections 139A-141B. The air within the core gas path 162 may be referred to as "core air". The bypass gas path 164 extends through a bypass duct, which bypasses the engine core. The air within the bypass gas path 164 may be referred to as "bypass air".

The core air is compressed by the compressor rotors 149 and 150 and directed into a combustion chamber 166 of a combustor (e.g., the combustor 120) in the combustor section 140. Fuel is injected into the combustion chamber 166 and mixed with the compressed core air to provide a fuel-air mixture. This fuel air mixture is ignited and combustion products thereof flow through and sequentially cause the turbine rotors 151 and 152 to rotate. The rotation of the turbine rotors 151 and 152 respectively drive rotation of the compressor rotors 150 and 149 and, thus, compression of the air received from a core airflow inlet. The rotation of the turbine rotor 152 also drives rotation of the fan rotor 148, which propels bypass air through and out of the bypass gas path 164. The propulsion of the bypass air may account for a majority of thrust generated by the turbine engine 130, e.g., more than seventy-five percent (75%) of engine thrust. The turbine engine 130 of the present disclosure, however, is not limited to the foregoing exemplary thrust ratio.

The fastener assembly 20 may be configured for various turbine engines other than the one described above as well as in other types of rotational equipment and non-rotational equipment. The fastener assembly 20, for example, may be configured for a geared turbine engine where a gear train connects one or more shafts to one or more rotors in a fan section, a compressor section and/or any other engine section. Alternatively, the fastener assembly 20 may be configured for a turbine engine configured without a gear train. The fastener assembly 20 may be configured for a geared or non-geared turbine engine configured with a single spool, with two spools (e.g., see FIG. 20), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly, comprising:
a fastener washer configured as a flat washer; and
a fastener nut secured to the fastener washer with wax;
the wax comprising a first wax member and a second wax member, the first wax member extending from a first point on the fastener nut to a point on the fastener washer, and the second wax member extending from a second point on the fastener nut to the point on the fastener washer; and
the fastener nut comprising a plurality of peaks arranged circumferentially about a centerline of the fastener nut, wherein the first point on the fastener nut is on a first of the plurality of peaks, and the second point on the fastener nut is on a second of the plurality of peaks.

2. The assembly of claim 1, wherein a centerline of an aperture extending through the fastener washer is laterally offset from a center point of the fastener washer.

3. The assembly of claim 1, wherein a centerline of an aperture extending through the fastener washer is coincident with a center point of the fastener washer.

4. The assembly of claim 1, wherein the wax is disposed at a corner between a surface of the fastener washer and a surface of the fastener nut.

5. The assembly of claim 4, wherein the surface of the fastener washer is angularly offset from the surface of the fastener nut.

6. The assembly of claim 1, wherein a third of the plurality of peaks is between and adjacent the first of the plurality of peaks and the second of the plurality of peaks.

7. The assembly of claim 1, wherein the fastener washer includes at least one cooling feature.

8. The assembly of claim 1, further comprising
a cartridge with a first locator and a second locator;
a first washer-nut pair mated with the first locator; and
a second washer-nut pair mated with the second locator, the second washer-nut pair comprising the fastener washer and the fastener nut.

9. The assembly of claim 8, wherein
the first washer-nut pair may be one of a plurality of first washer-nut pairs mated with the first locator; and
the second washer-nut pair may be one of a plurality of second washer-nut pairs mated with the second locator.

10. The assembly of claim 1, wherein
the fastener washer includes a first side surface, a second side surface and an aperture that extends along a centerline through the fastener washer from the first side surface to the second side surface;
the first side surface is an annular flat surface; and
the fastener nut contacts the first side surface.

11. An assembly, comprising:
a fastener washer; and
a fastener nut secured to the fastener washer with wax;
the wax configured in a truss configuration.

12. An assembly, comprising:
a fastener washer; and
a fastener nut secured to the fastener washer with wax;
the wax comprising a first wax member and a second wax member, the first wax member extending from a first point on the fastener nut to a point on the fastener washer, and the second wax member extending from a second point on the fastener nut to the point on the fastener washer, wherein the point on the fastener washer is located at an outer peripheral edge of the fastener washer.

* * * * *